(12) United States Patent
Frank

(10) Patent No.: US 7,072,348 B2
(45) Date of Patent: Jul. 4, 2006

(54) SYSTEM AND METHOD FOR IN-SERVICE RECONFIGURATION OF A SYNCHRONOUS OPTICAL COMMUNICATIONS NETWORK

(75) Inventor: Ronald Arthur Frank, Calgary (CA)

(73) Assignee: Ciena Corporation, Linthicum, MD (US)

( * ) Notice: Subject to any disclaimer, the term of this patent is extended or adjusted under 35 U.S.C. 154(b) by 954 days.

(21) Appl. No.: 09/725,730

(22) Filed: Nov. 29, 2000

(65) Prior Publication Data

US 2002/0064179 A1 May 30, 2002

(51) Int. Cl.
*H04L 12/26* (2006.01)

(52) U.S. Cl. .................... 370/412; 370/468
(58) Field of Classification Search ............ 370/412, 370/468
See application file for complete search history.

(56) References Cited

U.S. PATENT DOCUMENTS

2003/0026298 A1 * 2/2003 Bisson et al. ............... 370/537

OTHER PUBLICATIONS

S.C. Ntafos et al., 'On the Complexity of Some Coding Problems', IEEE Transactions on Information Theory, vol. II–27, No. 6, Nov. 1981, pp. 794–796.*

* cited by examiner

*Primary Examiner*—Melvin Marcelo

(74) *Attorney, Agent, or Firm*—Merek & Blackmon & Voorhees, LLC

(57) ABSTRACT

A method and system for in-service reallocation of bandwidth (i.e. STS-1's) in a synchronous optical network (SONET) i.e. without interruption of the transport of data frames transmitted from a transmit node and received at a receive node, the transmit node comprising a mapper/aggregator, a first bandwidth configuration memory associated with the mapper/aggregator and a transmit framer and the receive node comprising a demapper/deaggregator, a second bandwidth configuration memory associated with the demapper/deaggregator and a receive framer. First and second memory banks are provided to the first and second bandwidth configuration memory, whereby the first memory bank of the first bandwidth configuration memory comprises current bandwidth allocation mapping information used by the mapper/aggregator and the first memory bank of the second bandwidth configuration memory comprises current bandwidth allocation mapping information used by the demapper/deaggregator. Updated bandwidth allocation mapping information is provided to the second memory banks. A bandwidth reconfiguration update request is generated and a reconfiguration flag is generated at the transmit node in response to the update request. The reconfiguration flag is transmitted from the transmit node to the receive node and the reconfiguration flag is detected at the receive node. The updated bandwidth allocation mapping information of the first bandwidth configuration memory's second memory bank is selected for use by the mapper/aggregator in response to the generation of the reconfiguration flag and the updated bandwidth allocation mapping information of the second bandwidth configuration memory's second memory bank is selected for use by the demapper/deaggregator in response to the detection of the reconfiguration flag.

15 Claims, 2 Drawing Sheets

SYSTEM AND METHOD FOR IN-SERVICE RECONFIGURATION OF A SYNCHRONOUS OPTICAL COMMUNICATIONS NETWORK

FIELD OF THE INVENTION

This invention relates to a system and method of reallocating bandwidth (i.e. STS-1's) of a synchronous optical network (SONET), amongst clients, without any interruption in the transport of data, by timely mapping of the data according to a new bandwidth configuration at transmit and receive nodes of the network.

BACKGROUND OF THE INVENTION

A SONET signal (i.e. such as STS-48, meaning 48 synchronous transport streams) is typically composed of multiple STS-1's which are assigned to various resources or clients, with the greater the number of STS-1's representing increased bandwidth. Typically, reallocating the STS-1's amongst the clients is done by re-provisioning, whereby the data channel between the clients of the transmit and receive nodes must be taken out of service, resulting in an interruption of communications and service.

There is a need, therefore, for means to reallocate STS-1's amongst clients on an "in-service" basis with no perceived interruption in data communication service by the clients.

SUMMARY OF THE INVENTION

In accordance with the present invention there is provided a method for reconfiguring the allocation of bandwidth used at transmit and receive nodes of a synchronous optical data communications network wherein data frames are transmitted from the transmit node and received at the receive node, the transmit node comprising a mapper/aggregator, a first bandwidth configuration memory associated with said mapper/aggregator and a transmit framer and the receive node comprising a demapper/deaggregator, a second bandwidth configuration memory associated with said demapper/deaggregator and a receive framer. First and second memory banks are provided to the first and second bandwidth configuration memory, whereby the first memory bank of the first bandwidth configuration memory comprises current bandwidth allocation mapping information used by the mapper/aggregator and the first memory bank of the second bandwidth configuration memory comprises current bandwidth allocation mapping information used by the demapper/deaggregator. Updated bandwidth allocation mapping information is provided to the second memory banks. A bandwidth reconfiguration update request is generated and a reconfiguration flag is generated at the transmit node in response to the update request. The reconfiguration flag is transmitted from the transmit node to the receive node and the reconfiguration flag is detected at the receive node. The updated bandwidth allocation mapping information of the first bandwidth configuration memory's second memory bank is selected for use by the mapper/aggregator in response to the generation of the reconfiguration flag and the updated bandwidth allocation mapping information of the second bandwidth configuration memory's second memory bank is selected for use by the demapper/deaggregator in response to the detection of the reconfiguration flag.

Preferably the completion of the generation of the flag is signalled and the first and second memory banks of the first bandwidth configuration memory are swapped in response to the generation completion signalling. Similarly, the detection of the reconfiguration flag is preferably signalled and the first and second memory banks of the second bandwidth configuration memory swapped in response to such detection signalling. The reconfiguration flag may be transmitted in a path overhead channel of the network and the flag preferably comprises a plurality of codewords (e.g. four) whereby the Hamming distance between the codewords is sufficiently large that the reconfiguration flag provides single-bit fault tolerance. Preferably, detection of the codewords is single codeword fault tolerant.

Also provided in accordance with the present invention is a system for such in-service reconfiguration of bandwidth in a synchronous optical data communications network, operating to reconfigure the allocation of bandwidth used at the transmit and receive nodes in response to a bandwidth reconfiguration update request generated within the network. A reconfiguration flag generator at the transmit node is configured for generating a reconfiguration flag in response to detection of an update request, the reconfiguration flag being configured for transmission from the transmit node to the receive node. A reconfiguration flag detector at the receive node is configured for detecting the reconfiguration flag. The first and second bandwidth configuration memory each comprise first and second memory banks. The first memory bank of the first bandwidth configuration memory comprises current bandwidth allocation mapping information used by the mapper/aggregator and the first memory bank of the second bandwidth configuration memory comprises current bandwidth allocation mapping information used by the demapper/deaggregator. The second memory banks are configured for receiving updated bandwidth allocation mapping information prior to the reconfiguration. The updated bandwidth allocation mapping information of the first bandwidth configuration memory's second memory bank is selected for use by the mapper/aggregator in response to completion of the reconfiguration flag generated by the generator and the updated bandwidth allocation mapping information of the second bandwidth configuration memory's second memory bank is selected for use by the demapper/deaggregator in response to detection of the reconfiguration flag by the detector.

Preferably the reconfiguration flag generator is configured for signalling the completion of the generation of the flag and a memory bank swapping component is provided at the transmit node for swapping the first and second memory banks of the first bandwidth configuration memory in response to the signalling by the generator. The reconfiguration flag detector may also be configured for signalling the detection of the reconfiguration flag and a memory bank swapping component may be provided at the receive node for swapping the first and second memory banks of the second bandwidth configuration memory in response to the signalling by the detector. The reconfiguration flag detector preferably comprises a finite state machine. The reconfiguration flag preferably comprises a plurality of codewords (e.g. four) having a sufficiently large Hamming distance between them to provide single-bit fault tolerance. Preferably, the detection of the codewords by the finite state machine is single codeword fault tolerant.

BRIEF DESCRIPTION OF THE DRAWINGS

Reference will now be made to the accompanying drawings which show, by way of example, a preferred embodiment of the present invention.

DETAILED DESCRIPTION OF THE ILLUSTRATED PREFERRED EMBODIMENT

Figure 1:
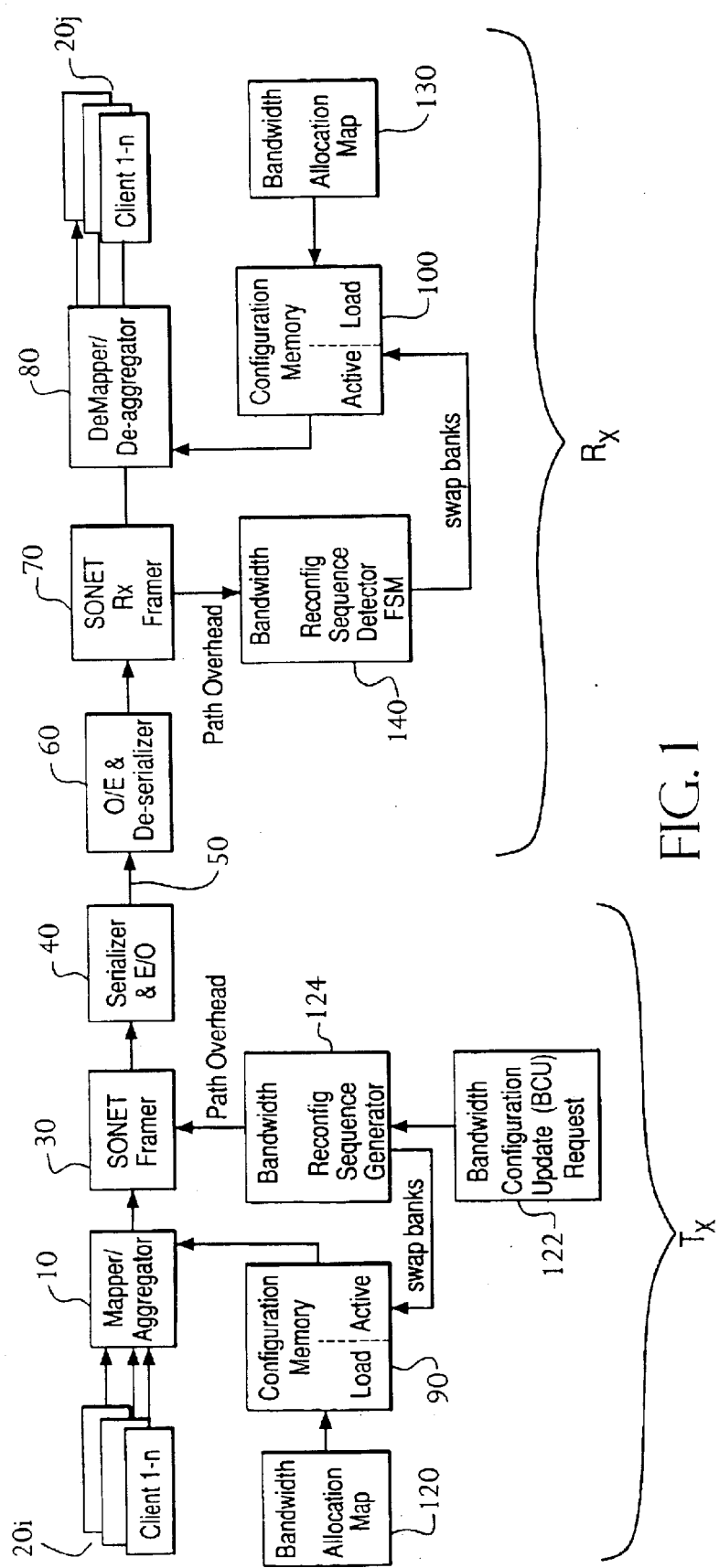
FIG. 1 is a functional block diagram of a synchronous optical network incorporating apparatus of a reconfiguration system in accordance with the invention.

FIG. 1 of the drawings is a functional block diagram of a synchronous optical network (SONET) in which there is incorporated the apparatus of a preferred embodiment of the in-service network reconfiguration system and method of the invention. The network components of the transmit (Tx) and receive (Rx) nodes (i.e. the transmitter and receiver, resp.) servicing clients are shown by FIG. 1. At the transmit node a mapper/aggregator 10 performs two related functions. First, it maps the client data into the SONET payload according to a mapping function which allocates STS-1's to a particular client $20_i$ based on the contents of the configuration memory. Since each STS-1 represents a fixed amount of bandwidth the number of STS-1's assigned to a client determines how much bandwidth is allocated to that client. Since each STS-1 is assigned to one client only, the second function that is performed by the mapper/aggregator 10 is aggregation of the client STS-1's into a composite STS-48 payload. The aggregate data stream is then fed into a standard SONET transmit framer 30 to insert section/line/path overhead information (data) and create a proper SONET frame. The parallel output from the framer 30 is then serialized and converted to an optical signal by a serializer/E-O converter 40 for transmission over an optical fibre 50.

At the receive node the received optical signal is converted back to an electrical signal and to parallel format by an O-E/deserializer converter 60 and then fed into a SONET receive framer 70 where the section/line/path overhead data is extracted and processed. The resulting data stream is passed into a deaggregator/de-mapper 80 which performs the inverse function of the mapper/aggregator 10. The de-aggregator section receives the composite STS-48 payload from the SONET framer and, based upon the local configuration memory, it then separates the composite STS stream into STS-1's according to the client $20_j$ they belong to. The de-mapper section then takes the STS-1's assigned to a particular client $20_j$ and extracts the client data from it.

The mapper/aggregator 10 and de-aggregator/de-mapper 80 each use a configuration memory 90 and 100, resp., to assign/map each STS-1 to a particular client. Each of the configuration memory modules 90, 100 comprise two memory banks: an active memory bank, which contains the mapping information currently used by the transmitter/receiver, and a load memory bank which loads/holds a new bandwidth configuration. The F2 byte in the SONET path overhead channel is used to carry a Bandwidth Reconfiguration Sequence (BRS) flag which is used to synchronize the time at which the active and load memory banks at the receive (Rx) node are swapped (exchanged) so as to effect an in-service reconfiguration of the STS-1's.

Network management software provides the transmit (Tx) and receive (Rx) nodes with a bandwidth allocation map 120,130 which assigns the STS-1's of the SONET link to the particular clients $20_i$, $20_j$. This bandwidth mapping information (data) is entered into the load memory bank of each of the configuration memory modules 90, 100.

In normal operation the F2 byte contains an IDLE code. However, when the configuration memories 90, 100 are updated a Bandwidth Configuration Update (BCU) request 122 is issued by the network management software. The BCU request 122 causes a bandwidth reconfiguration sequence generator 124 within the transmit (Tx) node of the network to generate a BRS flag and also a three flag sequence: BRS1, BRS2, and BRS3. Then, at the start of the fourth SONET frame, the active and load memory banks of the configuration memory modules 90,100 are swapped and the mapper/aggregator 10 begins mapping client data according to the new bandwidth configuration.

Figure 2:
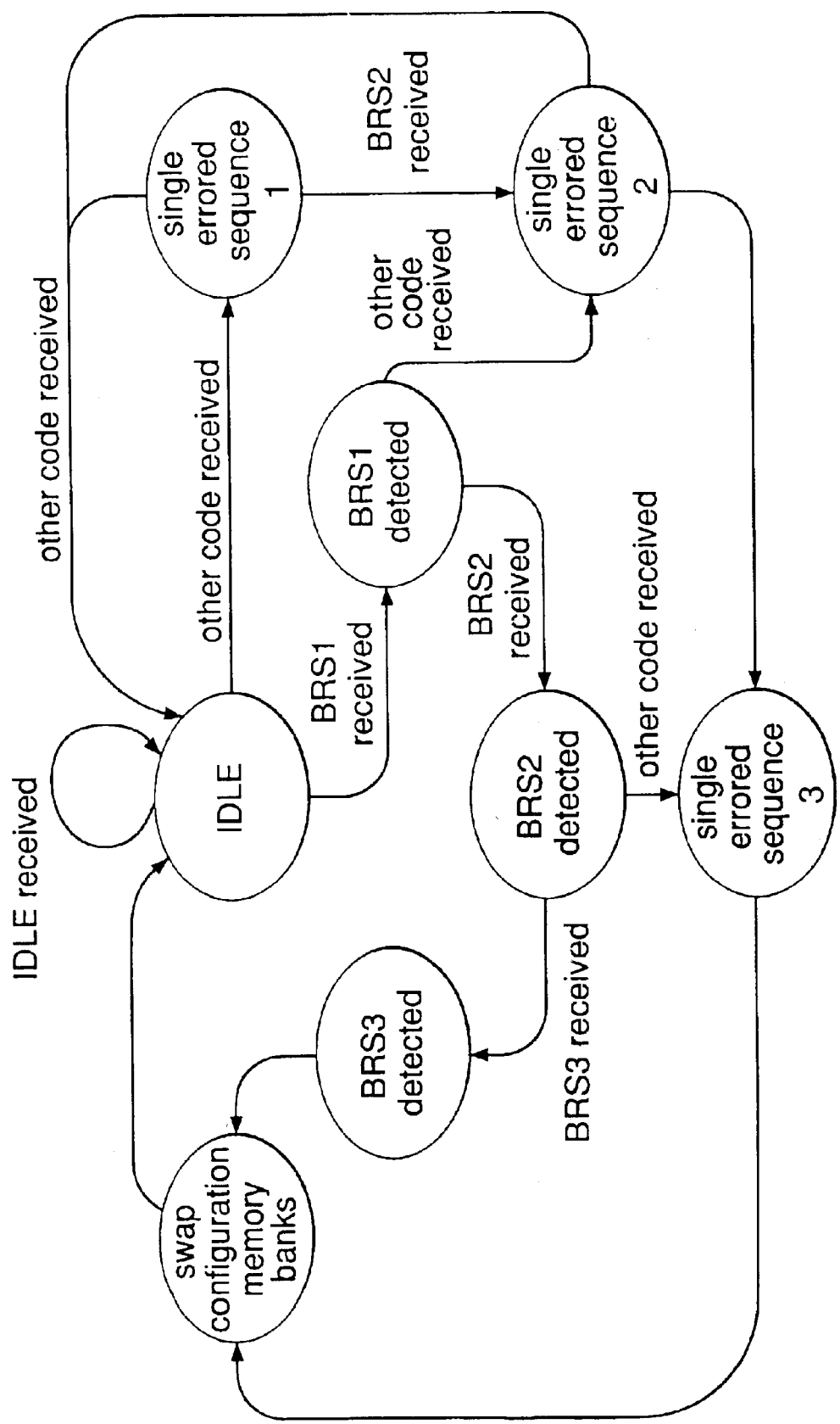
FIG. 2 is a state diagram of the receiver finite state machine (FSM) in relation to the flag signalling detected thereby.

At the receive (Rx) node a finite state machine (FSM) 140 detects the flag sequence on the F2 path overhead of the SONET signal. FIG. 2 is a state diagram of the FSM in relation to the BRS signalling detected thereby (i.e. it depicts a transition table describing the behaviour of the receiver state on the F2 byte). As shown by FIG. 2, when the three flag sequence, BRS1-BRS3, has been successfully received by the FSM the active and load memory banks of the bandwidth configuration memory module 100 are swapped and the de-mapper/deaggregator 80 begins extracting client data according to the new bandwidth configuration. Then the start of the next SONET frame is awaited. Because the "swap" data (i.e. the BRS signalling) is coincident with the transmitted data the receiver is able to determine the correct instant to begin using the new bandwidth allocation and the change-over to a new bandwidth configuration is achieved in-service.

In order to ensure that there is robustness in detection of the F2 flag sequence, the code words (IDLE, BRS1, BRS2 and BRS3) are chosen to have a sufficiently large Hamming distance to provide a single-bit fault tolerance. (i.e. such that a single bit error in any position of any of the code words would still allow it to be recognized unambiguously from the other code words). As shown by FIG. 2, the receiver FSM is thereby rendered immune to single-bit errors in the flag sequence. In addition to being single bit fault tolerant the FSM also allows detection of the BRS codes to be single codeword fault tolerant such that if a single codeword is severely in error it will not cause the BRS detection to fail.

Advantageously, from the perspective of a client using a SONET link which is reconfigured according to the foregoing, they will not experience any interruption of service and, instead, will simply see a change in bandwidth on its data channel. In turn, the change in bandwidth will affect the rate at which the client is able to send data. Since verification of the data channel after bandwidth re-allocation cannot be done by the usual means of verification used when a conventional re-provisioning method of bandwidth reconfiguration is applied (i.e. since, unlike the present method, the re-provisioning method takes the data channel out of service and tests such as loopback, or pseudo-random data generation/verification, can then be used to ensure the channel is functioning correctly before putting it back in service), if verification of the data channel is desired it is necessary to utilize another appropriate means of verification.

The individual electronic and processing functions utilised in the foregoing described preferred embodiment are, individually, well understood by those skilled in the art. It is to be understood by the reader that a variety of other implementations may be devised by skilled persons for substitution. Persons skilled in the field of communication design will be readily able to apply the present invention to an appropriate implementation method for a given application.

Consequently, it is to be understood that the particular embodiment shown and described herein by way of illustration is not intended to limit the scope of the invention claimed by the inventors which is defined by the appended claims.

What is claimed is:

1. A method for reconfiguring the allocation of bandwidth used at transmit and receive nodes of a synchronous optical data communications network wherein data frames are transmitted from said transmit node and received at said receive node and said transmit node comprises a mapper/aggregator, a first bandwidth configuration memory associated with said mapper/aggregator and a transmit framer and said receive node comprises a demapper/deaggregator, a second bandwidth configuration memory associated with said demapper/deaggregator and a receive framer, said method comprising:

(a) providing first and second memory banks to said first and second bandwidth configuration memory, whereby said first memory bank of said first bandwidth configuration memory comprises current bandwidth allocation mapping information used by said mapper/aggregator and said first memory bank of said second bandwidth configuration memory comprises current bandwidth allocation mapping information used by said demapper/deaggregator;

(b) providing updated bandwidth allocation mapping information to said second memory banks;

(c) generating a bandwidth reconfiguration update request;

(d) generating a reconfiguration flag at said transmit node in response to said update request;

(e) transmitting said reconfiguration flag from said transmit node to said receive node;

(f) detecting said reconfiguration flag at said receive node;

(g) selecting said updated bandwidth allocation mapping information of said first bandwidth configuration memory's second memory bank for use by said mapper/aggregator in response to said generation of said reconfiguration flag; and, (h) selecting said updated bandwidth allocation mapping information of said second bandwidth configuration memory's second memory bank for use by said demapper/deaggregator in response to said detection of said reconfiguration flag.

2. A method according to claim 1 and further comprising signalling the completion of said generation of said flag and swapping said first and second memory banks of said first bandwidth configuration memory in response to said generation completion signalling.

3. A method according to claim 2 and further comprising signalling the detection of said reconfiguration flag and swapping said first and second memory banks of said second bandwidth configuration memory in response to said detection signalling.

4. A method according to claim 3 and further comprising transmitting said reconfiguration flag within a path overhead channel of said network, whereby said flag comprises a plurality of codewords.

5. A method according to claim 4 whereby the Hamming distance between said codewords is sufficiently large that said reconfiguration flag provides single-bit fault tolerance.

6. A method according to claim 5 whereby said reconfiguration flag comprises four codewords.

7. A method according to claim 6 whereby detection of said codewords is single codeword fault tolerant.

8. A system for in-service reconfiguration of bandwidth in a synchronous optical data communications network wherein data frames are transmitted from a transmit node and received at a receive node, said transmit node comprising a mapper/aggregator, a first bandwidth configuration memory associated with said mapper/aggregator and a transmit framer, said receive node comprising a demapper/deaggregator, a second bandwidth configuration memory associated with said demapper/deaggregator and a receive framer, said bandwidth reconfiguration system operating to reconfigure the allocation of bandwidth used at said nodes in response to an update request generated within said network and comprising:

(a) a reconfiguration flag generator at said transmit node configured for generating a reconfiguration flag in response to detection of said update request, said reconfiguration flag configured for transmission from said transmit node to said receive node; and, (b) a reconfiguration flag detector at said receive node configured for detecting said reconfiguration flag;

wherein each said first and second bandwidth configuration memory comprises first and second memory banks, said first memory bank of said first bandwidth configuration memory comprising current bandwidth allocation mapping information used by said mapper/aggregator and said first memory bank of said second bandwidth configuration memory comprising current bandwidth allocation mapping information used by said demapper/deaggregator, said second memory banks configured for receiving updated bandwidth allocation mapping information prior to said reconfiguration, wherein said updated bandwidth allocation mapping information of said first bandwidth configuration memory's second memory bank is selected for use by said mapper/aggregator in response to completion of said reconfiguration flag generated by said generator and said updated bandwidth allocation mapping information of said second bandwidth configuration memory's second memory bank is selected for use by said demapper/deaggregator in response to detection of said reconfiguration flag by said detector.

9. A system according to claim 8 wherein said reconfiguration flag generator is configured for signalling the completion of generating said flag and further comprising a memory bank swapping component at said transmit node configured for swapping said first and second memory banks of said first bandwidth configuration memory in response to said signalling by said generator.

10. A system according to claim 9 wherein said reconfiguration flag detector is configured for signalling the detection of said reconfiguration flag and further comprising a memory bank swapping component at said receive node configured for swapping said first and second memory banks of said second bandwidth configuration memory in response to said signalling by said detector.

11. A system according to claim 10 wherein said reconfiguration flag is transmitted within a path overhead channel of said network and comprises a plurality of codewords.

12. A system according to claim 11 wherein said reconfiguration flag detector comprises a finite state machine.

13. A system according to claim 12 wherein the Hamming distance between said codewords is sufficiently large that said reconfiguration flag provides single-bit fault tolerance.

14. A system according to claim 13 wherein said reconfiguration flag comprises four codewords.

15. A system according to claim 14 wherein detection of said codewords by said finite state machine is single codeword fault tolerant.

* * * * *